US008348327B2

(12) United States Patent
Germenot et al.

(10) Patent No.: US 8,348,327 B2
(45) Date of Patent: Jan. 8, 2013

(54) FOLDING DEVICES FOR VEHICLE WINDSCREENS

(75) Inventors: Olivier Germenot, Versailles (FR); Bernard Timmer, Conflans-Sainte-Honorine (FR)

(73) Assignee: Nexter Systems, Roanne (FR)

( * ) Notice: Subject to any disclaimer, the term of this patent is extended or adjusted under 35 U.S.C. 154(b) by 0 days.

(21) Appl. No.: 13/232,247

(22) Filed: Sep. 14, 2011

(65) Prior Publication Data

US 2012/0068495 A1   Mar. 22, 2012

(30) Foreign Application Priority Data

Sep. 17, 2010  (FR) ........................................ 10 03709

(51) Int. Cl.
*B60J 1/04* (2006.01)

(52) U.S. Cl. .................... 296/92; 296/187.07; 296/84.1; 89/36.08

(58) Field of Classification Search .................. 296/84.1, 296/187.07, 92; 89/36.08, 936, 36.07
See application file for complete search history.

(56) References Cited

U.S. PATENT DOCUMENTS

| 1,032,857 | A | * | 7/1912 | Pearson | 296/92 |
|---|---|---|---|---|---|
| 1,055,346 | A | * | 3/1913 | McQuillan | 296/92 |
| 1,121,576 | A | * | 12/1914 | Ackerman | 296/92 |
| 1,163,413 | A | * | 12/1915 | Kern | 296/92 |
| 1,222,294 | A | * | 4/1917 | James | 296/92 |
| 1,376,887 | A | * | 5/1921 | Johnson | 296/92 |
| 1,434,604 | A | * | 11/1922 | Galloway | 296/92 |
| 1,537,706 | A | * | 5/1925 | Sandgren | 296/92 |
| 1,834,193 | A | * | 12/1931 | Williams | 296/92 |
| 1,878,584 | A | | 9/1932 | Jones | |
| 2,355,860 | A | * | 8/1944 | Hansen | 15/250.3 |
| 2,423,623 | A | * | 7/1947 | Schassberger | 296/92 |
| 6,983,974 | B2 | * | 1/2006 | Suzuki | 296/78.1 |
| 7,144,061 | B1 | * | 12/2006 | Behm et al. | 296/96.11 |
| 7,905,534 | B2 | * | 3/2011 | Boczek et al. | 296/84.1 |
| 2012/0068495 | A1 | * | 3/2012 | Germenot et al. | 296/97.8 |

FOREIGN PATENT DOCUMENTS

| DE | 2 033 733 | 2/1972 |
|---|---|---|
| GB | 406317 | 2/1934 |
| GB | 592272 | 9/1947 |
| GB | 741644 | 12/1955 |

OTHER PUBLICATIONS

French Search Report issued in French Patent Application No. FR 1003709 dated May 9, 2011 (with translation).

* cited by examiner

*Primary Examiner* — Glenn Dayoan
*Assistant Examiner* — Gregory Blankenship
(74) *Attorney, Agent, or Firm* — Oliff & Berridge, PLC

(57) ABSTRACT

A fold down device for the windscreen of a vehicle and in particular for an armored windscreen, wherein said device incorporates two uprights hinged by a first end to the structure of the cab of said vehicle, each of said uprights being placed in the vicinity of the lateral edge of said windscreen, said windscreen being linked to each of said uprights by a connecting rod that is hinged on one side to the second end of each of said uprights and on the other to said windscreen.

8 Claims, 9 Drawing Sheets

FOLDING DEVICES FOR VEHICLE WINDSCREENS

BACKGROUND OF THE INVENTION

1. Field of the Invention

The technical scope of the invention is that of folding devices for vehicle windscreens.

2. Description of the Related Art

For reasons of transport convenience, certain vehicles need to be able to lower all or part of their windscreen. This enables a lesser volume to be obtained, or for example, enables auxiliary equipment to be passed through without interfering with the windscreen.

This is the case in particular for artillery mounted on carrier trucks and for which during air transport phases the gun barrel needs to be lowered into a substantially horizontal position causing the gun barrel to pass through the cab which is only possible if the windscreen is folded down.

This type of lowering device is also well known on vehicles such as the well-known Jeep or others described by patent GB592272. On this type of device, the glass part of the windscreen is integral with a frame or with uprights that are hinged with respect to the vehicle's structure thanks to a horizontal pivot link that is located below the lower edge of the glass part. This pivot link enables the windscreen to be lowered onto the hood of the vehicle by simple rotation of the glass part.

However, on certain vehicles, and namely on military armored vehicles, the windscreen incorporates very thick armored glass. This thickness does not enable the positioning of a hinge on its lower edge to enable the windscreen to fold down since the over-thickness of the windscreen would interfere with the vehicle hood.

Furthermore, it is sometimes impossible for reasons of its integration into the vehicle to position a rotational axis for the windscreen below the latter.

By way of example, FIG. 1 shows a configuration to mount a windscreen 4 onto a vehicle 1 whose structure incorporates a cab 2 with a front hood 3. This windscreen 4 incorporates an armored glass part 4a that is relatively thick and integral with a frame 5.

Note that, in this configuration, the lower edge 5a of the frame is very close to the front hood 3. It is not possible to place a hinge below this lower edge 5a.

If, on the contrary, a rotational pivot 6 is positioned integral with the cab structure and above the lower edge 5a, it is clear that the windscreen 4 cannot be folded down around this pivot 6 since the lower edge 5a will mechanically interfere with the cab.

SUMMARY OF THE INVENTION

The invention proposes to overcome this problem by proposing means to enable the windscreen to be pivoted without any interference whilst having a pivoting axis above the lower edge of the windscreen.

For this, the invention incorporates pivoting uprights that enable the windscreen to be displaced with respect to the cab so as to distance it from the latter before making it pivot. For this, the windscreen is firstly brought up to a zone from which it may thereafter be folded down and this without causing any interference.

The invention consists of a fold down device for the windscreen of a vehicle and in particular for an armored windscreen, device wherein it incorporates two uprights hinged by a first end to the structure of the vehicle's cab, each upright being placed in the vicinity of the lateral edge of the windscreen, the windscreen being linked to each upright by a connecting rod that is hinged on one side to the second end of said upright and on the other to the windscreen.

Advantageously, the connecting rod hinge is placed above the centre of gravity of the windscreen.

According to one characteristic of the invention, at least one of the uprights incorporates a bearing surface able to receive the windscreen.

Advantageously, each connecting rod incorporates means to adjust its length.

According to one variant of the invention, at least one of the uprights incorporates means to make the windscreen in its folded down position integral with the cab structure.

Advantageously, the invention comprises at least one helper spring fixed between an upright and the cab structure.

BRIEF DESCRIPTION OF THE DRAWINGS

The invention will become more apparent from the following description made with reference to the appended drawings in which.

DETAILED DESCRIPTION OF PREFERRED EMBODIMENTS

Figure 1:
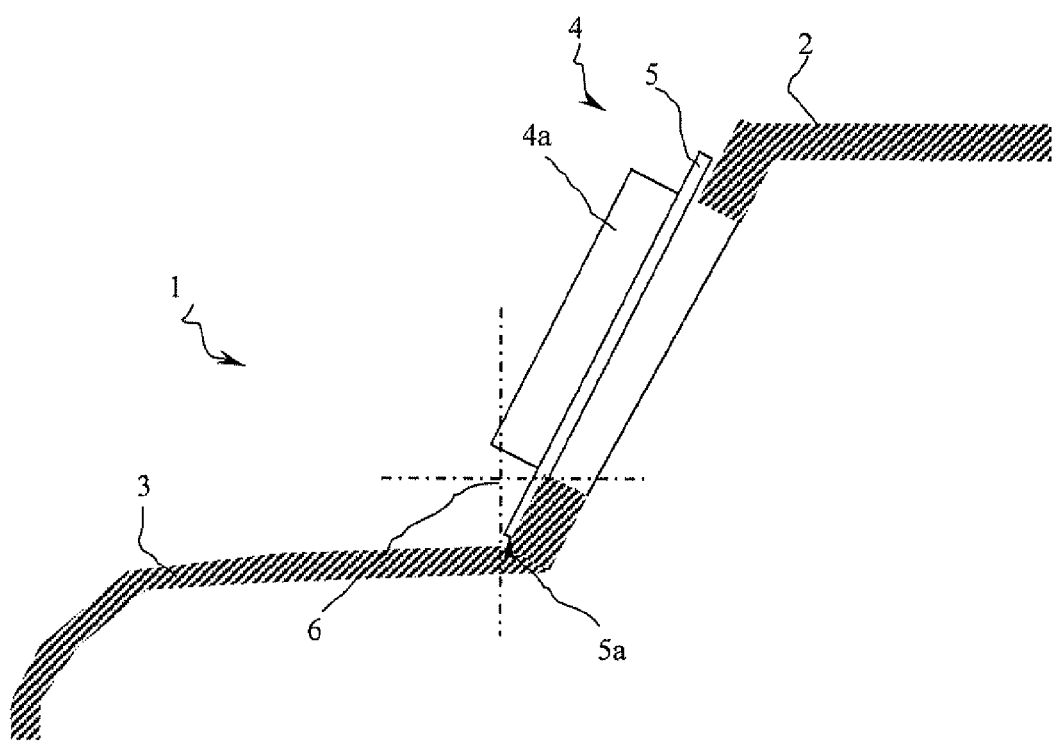
FIG. 1 (described in the preamble) schematically shows a side section view of one vehicle cab incorporating a windscreen that poses the problem which the invention is seeking to overcome.
Figure 2:
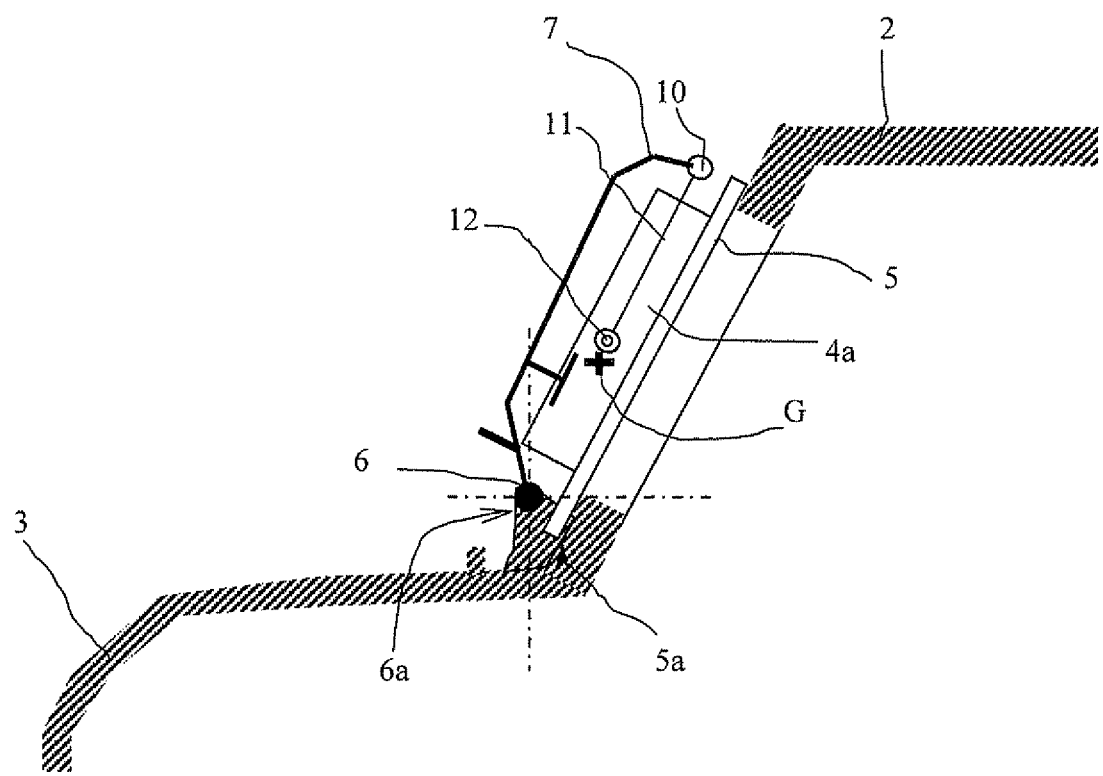
FIG. 2 schematically shows a side section view of a vehicle cab equipped with the windscreen fold down device according to one embodiment of the invention.

According to FIG. 2 and according to one embodiment of the invention, the fold down device for the windscreen proposed by the invention is adapted to the structure of a vehicle cab 2 such as that shown in FIG. 1. Note that the windscreen 4 is in the same configuration and the same position as shown in FIG. 1, thus that the problem of mechanical interfaces described in the preamble of the present application is potentially present. The windscreen 4 is formed of a glass surface 4a surrounded by a frame 5.

The frame 5 is metallic and rectangular; it completely surrounds the glass surface 4a and ensures it is held in place. For this, the frame 5 has a plane edge 5b around its circumference perforated by holes 23 (which can only be seen in FIG. 9) that enable the windscreen 4 to be screwed onto the cab 2.

The fold down device incorporates two uprights 7 hinged to the cab 2 of the vehicle 1 by two pivot links 6 around a geometric axis 6a (only one upright 7 and a single pivot link 6 are illustrated). Note that axis 6a is positioned above the lower edge 5a of the windscreen 4. The upper end of each upright 7 extends above the glass surface 4a of the windscreen 4 and is fitted with a hinge 10 onto which a connecting rod 11 is attached.

The other end of the connecting rod 11 is linked by means of a hinge 12 to the frame 5 of the windscreen 4, such hinge 12 being located above the centre of gravity G of the latter.

Thus, the two uprights 7 are linked to the windscreen 4 only by means of two hinged connecting rods 11.

Figure 3:
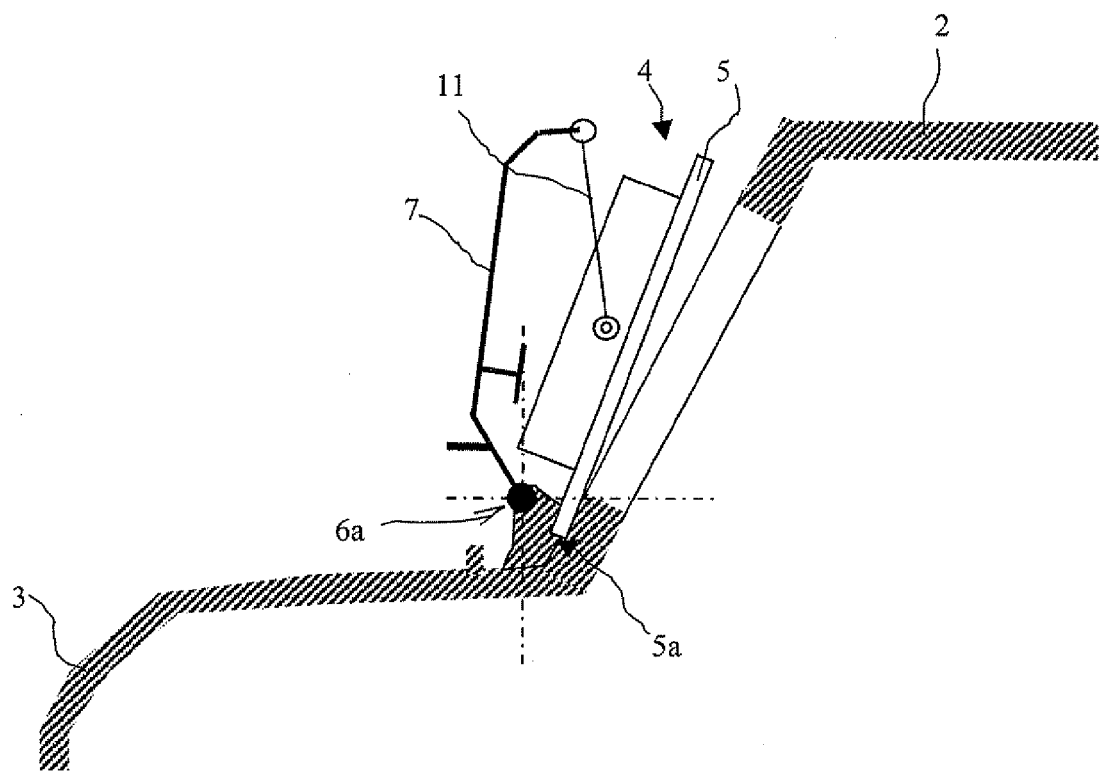
FIG. 3 schematically shows a side section view of this vehicle cab as the windscreen begins to fold down.

According to FIG. 3, tilting the upright 7 around the axis 6a towards the vehicle hood 3 causes traction of the connecting rod 11 on the windscreen 4. This detaches from the cab 2 at its upper part by rotating around the lower horizontal edge 5a of the frame 5. Naturally, the uprights 7 are made to pivot only when the screws ensuring the attachment of the windscreen 4 to the vehicle cab 2 have been removed.

Figure 4:
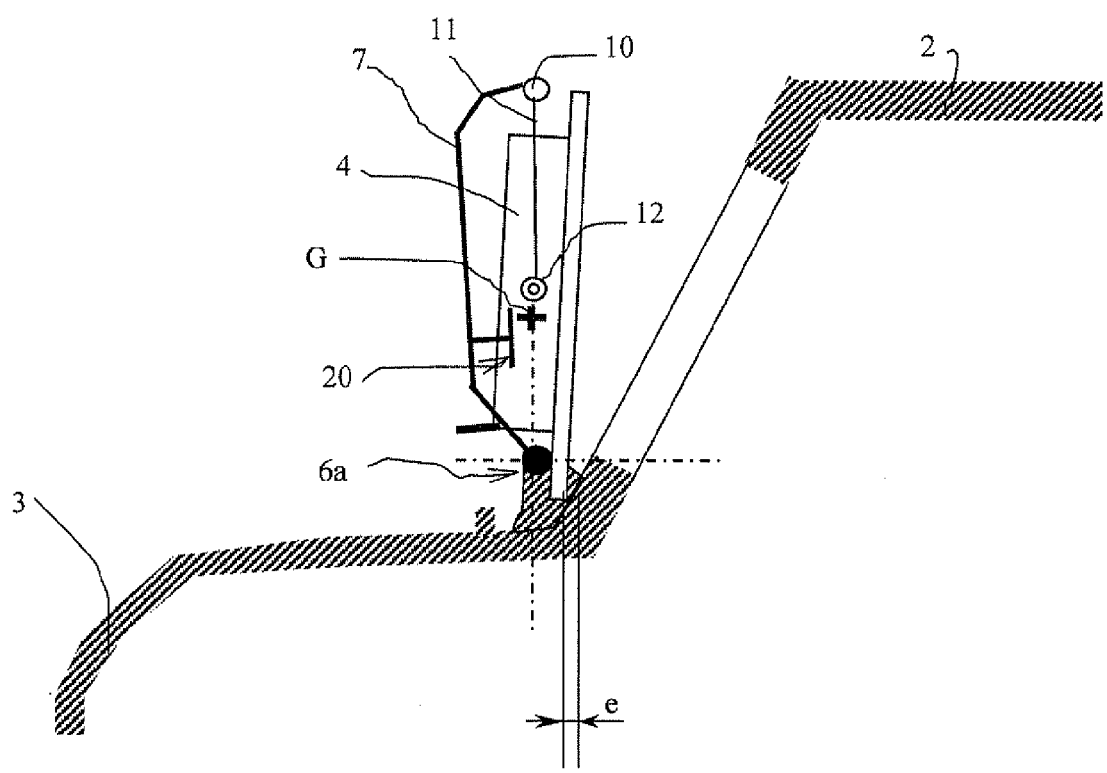
FIG. 4 schematically shows a side section view of this vehicle cab, as the windscreen is folded down, with the windscreen in the vertical position.

As can be seen in FIG. 4, continuing the rotational movement of the uprights 7 around their rotational axis 6a, the windscreen 4 is moved away from the vehicle cab 2 (as shown by reference (e) in the Figure). The windscreen 4 is thus suspended from the uprights 7 by the two connecting rods 11. The centre of gravity G of the windscreen will be positioned by gravity right above the upper hinge 10 (which is here substantially in the same plane as the rotational axis 6a).

Figure 5:
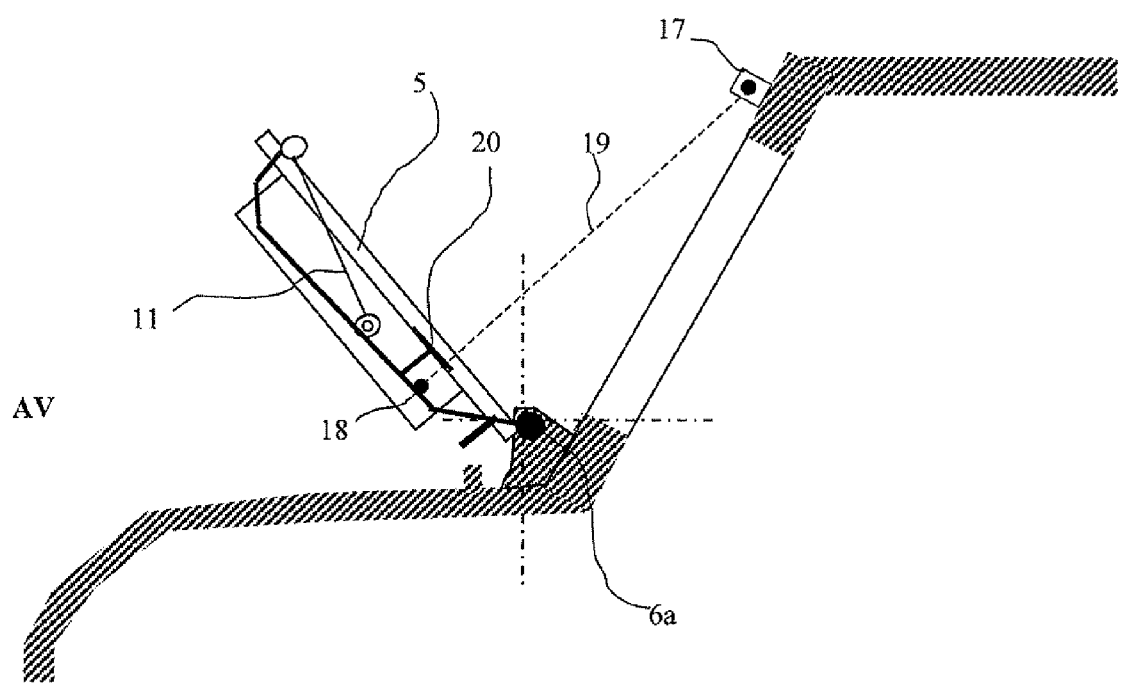
FIG. 5 schematically shows a side section view of this vehicle cab as the windscreen is folded down.

FIG. 5 shows that by continuing to rotate the uprights 7 around the rotational axis 6a, the centre of gravity G of the windscreen 4 will move to the fore of the axis 6a pulling the windscreen to the front AV of the vehicle. The upright 7 further incorporates a bearing surface 20 onto which a corresponding surface of the windscreen 4 will press (here it is the frame 5). This bearing surface 20 prevents the windscreen 4 suspended from the connecting rods 11 from swinging and obliges the windscreen 4 to follow the rotation around the axis 6a communicated by the uprights 7.

Figure 6:
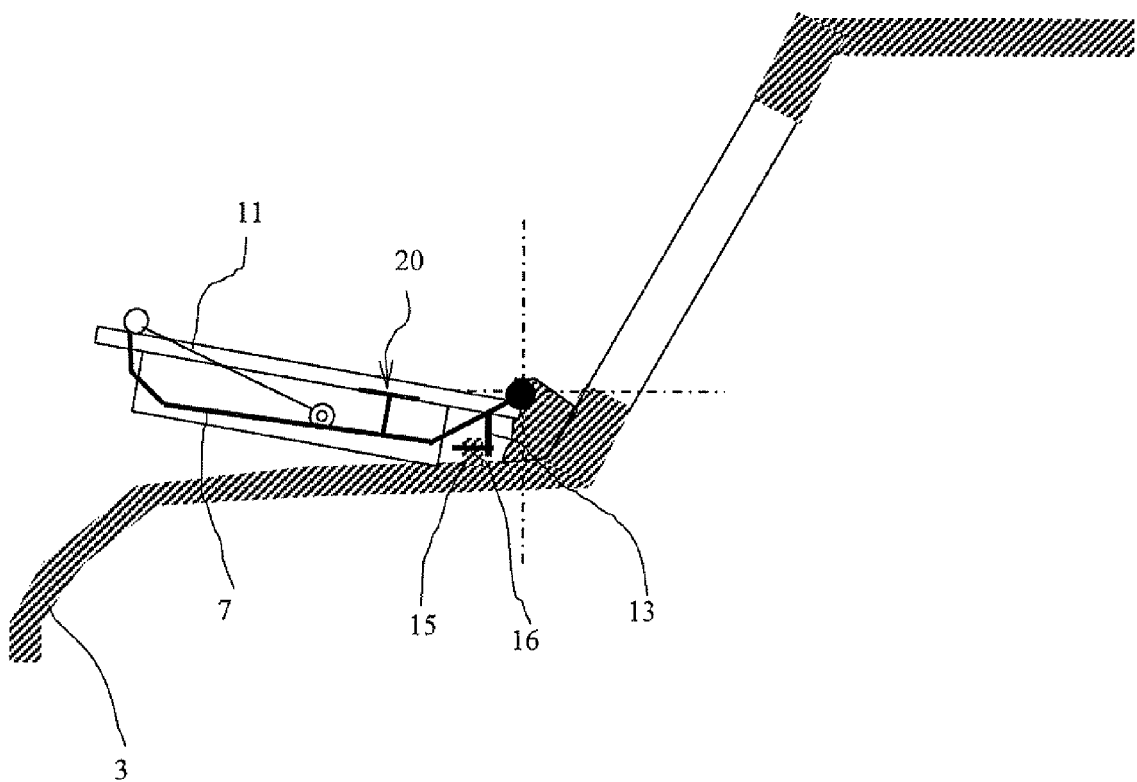
FIG. 6 schematically shows a side section view with the windscreen lying on the hood on the vehicle.

According to FIG. 6, the uprights 7 on which the windscreen 4 now rests finish rotating until they come into contact with the vehicle's front hood 3. At least one of the uprights 7 incorporates means 13 to ensure its joining with the structure of the vehicle cab.

In the example shown, an upright 7 incorporates a fastening lug 13 positioned opposite a fastening stud 15 integral with the cab structure 2 of the vehicle 1. The lug and stud 15 each incorporate a drill hole positioned facing one another when the windscreen 4 is pressing on the front hood. A pin 16 or screw is placed in these drill holes so as to join the uprights 7 and windscreen 4 to the cab 2. The lug 13, the stud 15 and the screw 16 form a device to join the windscreen and the cab in the folded down position.

Note that when the device is used when putting in place a new windscreen or replacing the windscreen, each of the connecting rods 11 incorporates means to adjust the vertical position of the windscreen 4 with respect to the cab 2, by positioning the drill holes used to attach the windscreen 4 to the vehicle cab. These adjustment means (not shown) may, for example, be turnbuckle devices or screw/nut systems.

Lastly, given the mass of an armored windscreen, helper springs 19 (for example, lever-activated gas cylinders—see FIGS. 5 and 8) will advantageously be mounted between each upright 7 and a fixed point of the cab near the upper edge of the opening filled in by the windscreen.

By way of example, FIG. 5 shows an upper fixed point 18 integral with the upright 7. The dotted line 19 represents the helper spring.

As has been seen, the connecting rods 11 may be advantageously attached to a hinge 12 located above the centre of gravity G of the windscreen 4. Such an arrangement facilitates the tilting of the windscreen towards the bearing surfaces 20 of the uprights 7. It is also possible to locate the hinge 12 substantially at the centre of gravity or else slightly below it. In this case, the equilibrium of the suspended windscreen (FIG. 4) is unstable and it can pivot in one way or the other around the hinge 12.

However, this hardly poses any problems in practice since the bearing surfaces (shown schematically in the Figures) extend in fact substantially over the full length of the uprights 7. The frame 5 of the windscreen thus comes to butt against the bearing surfaces 20 in any case, either by its upper edge or its lower edge.

Figure 7:
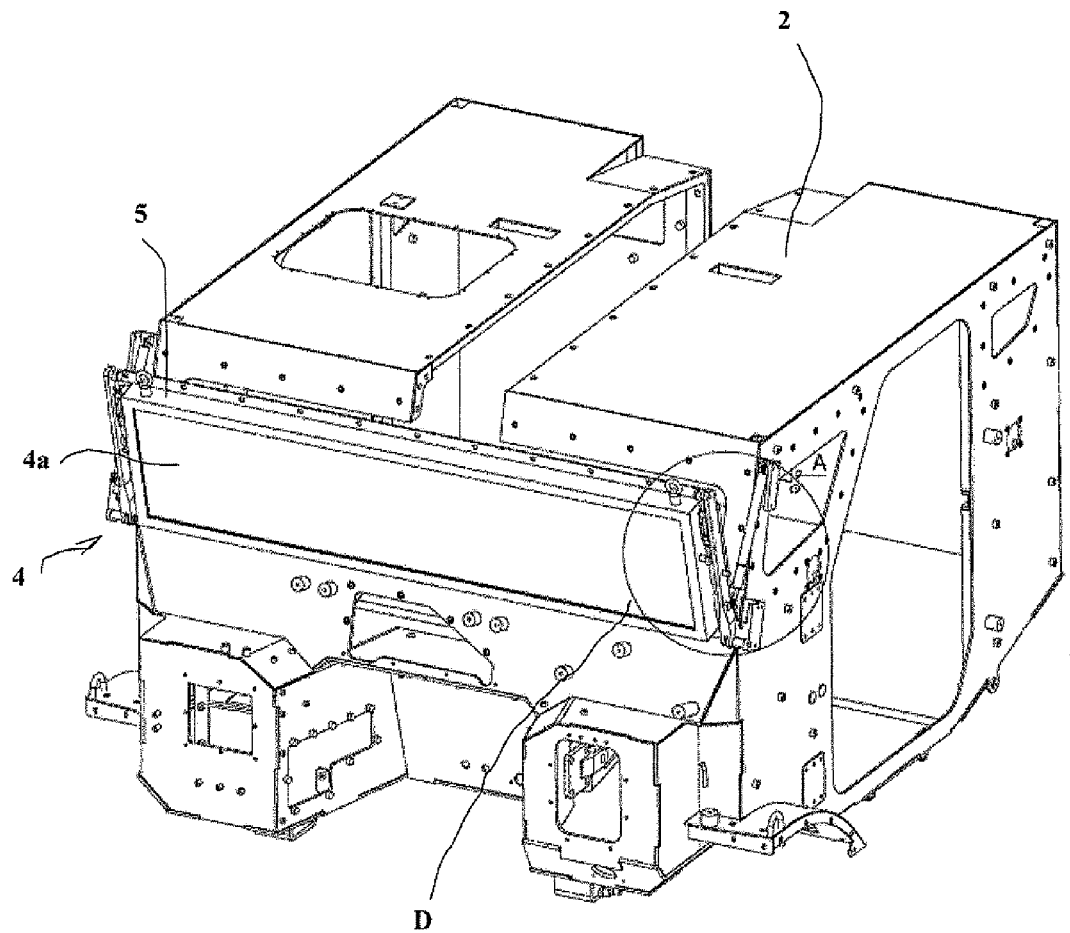
FIG. 7 shows a three-quarter view of one embodiment of the invention mounted on the cab of an armored vehicle.

By way of example, FIG. 7 shows a particular embodiment of a device according to the invention adapted to an armored cab 2. The folding device according to the invention is located at each end of the windscreen 4. A circle D in FIG. 7 shows the location of one of the folding devices. An enlarged view of the content of this circle D can be seen in FIG. 8.

Figure 8:
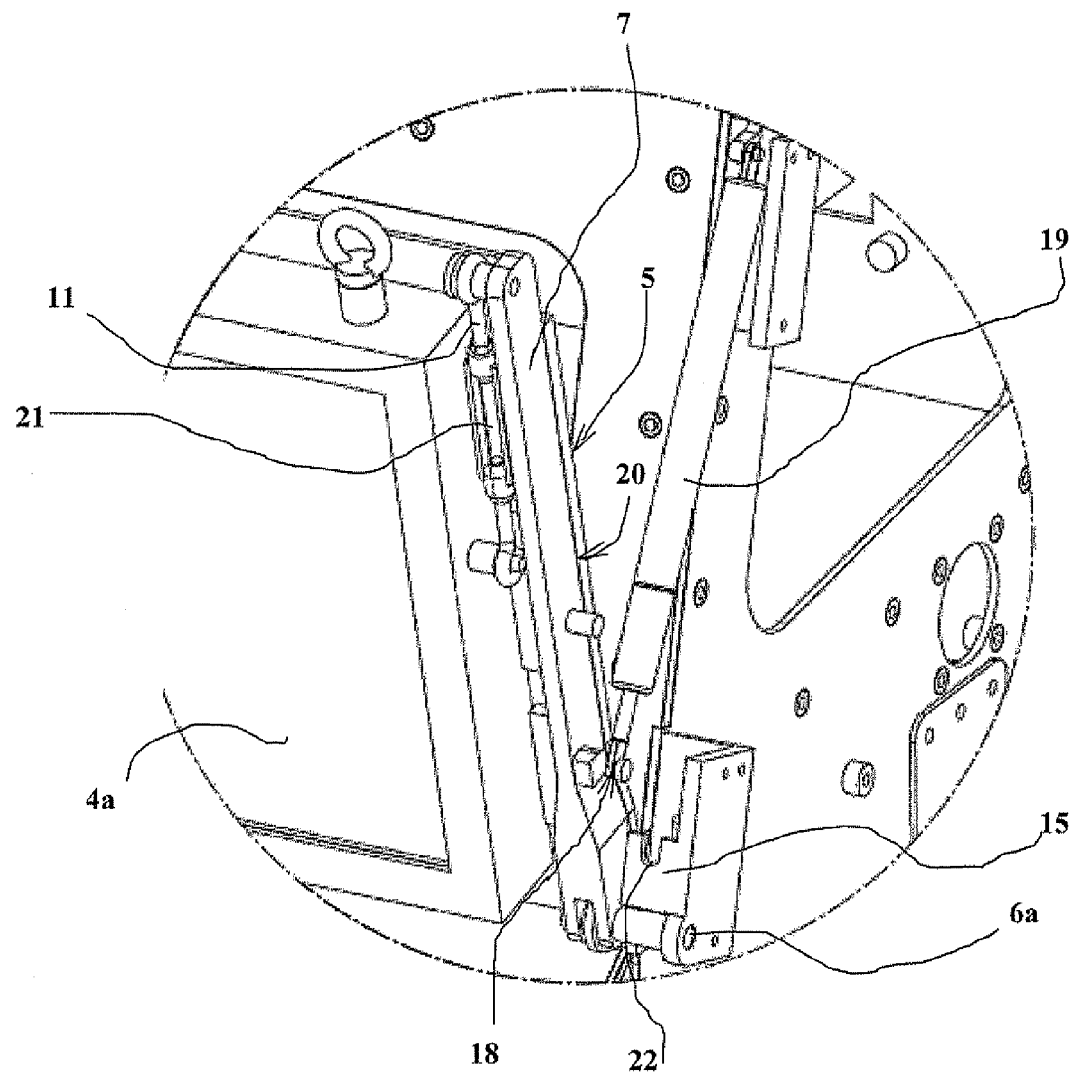
FIG. 8 shows a detailed view of FIG. 7.
Figure 9:
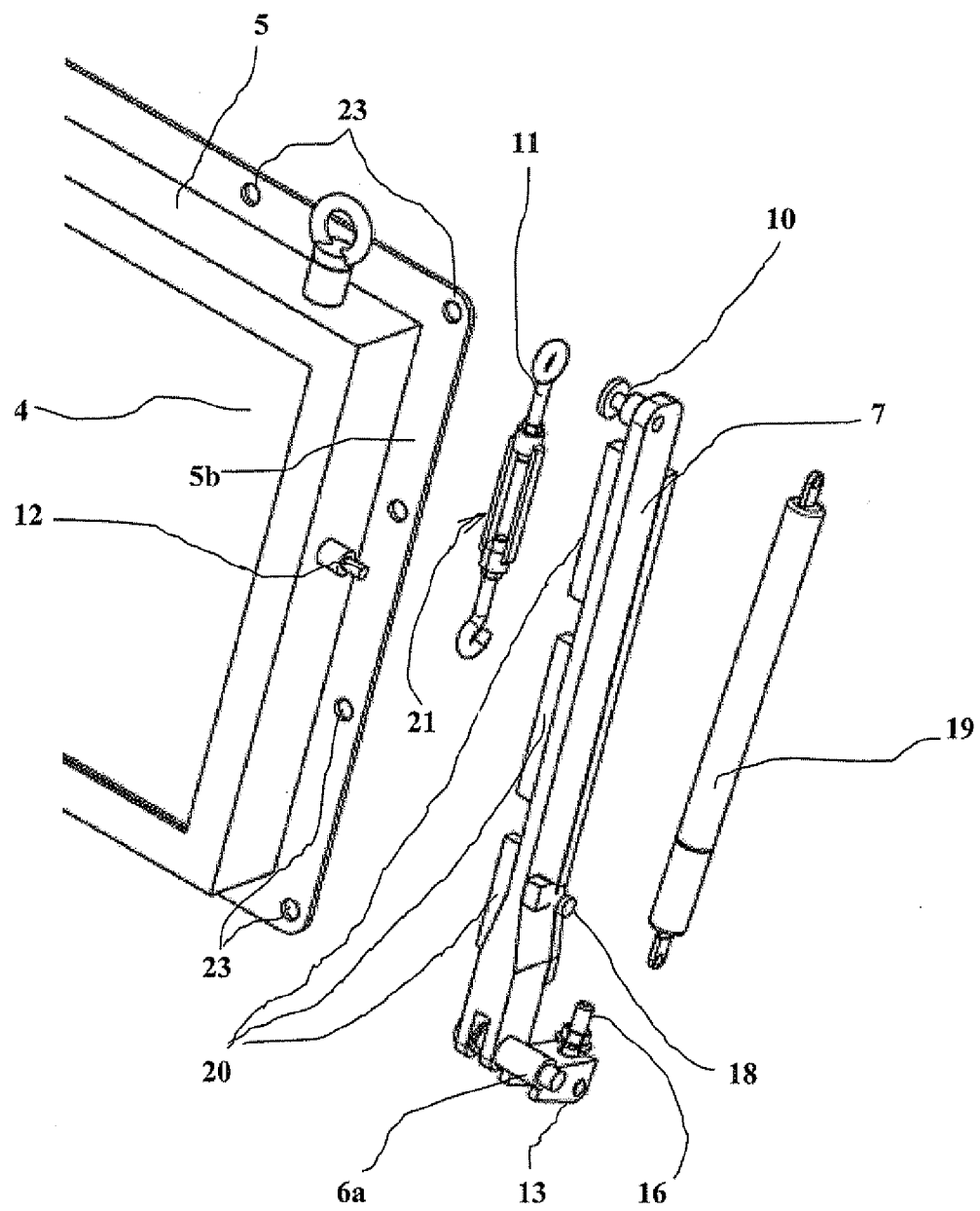
FIG. 9 shows an exploded view of the device in FIG. 8.

FIG. 8 shows the windscreen 4 slightly lowered and the frame 5 of the windscreen 4 is in contact with the surface 20 of the upright 7, which can be seen more clearly in FIG. 9. Note that the connecting rod 11 incorporates a turnbuckle 21 to adjust the length of the connecting rod 11 and thus the position of the windscreen 4. Only the fastening stud 15 fixed to the cab 2 and which forms part of the device to join the windscreen 4 to the cab structure 2 can be seen. The fastening lug 13 has a screw 16 to lock it in place as seen in FIG. 9.

FIG. 9 shows the different constitutive elements of the device separately from one another. In the case of this Figure, there is a device mounted to the right of the windscreen 4 whose exterior face is that seen in FIG. 9. Note that the frame 5 of the windscreen incorporates an edge 5b perforated with holes 23 enabling it to be screwed onto the cab 2.

The upright 7 incorporates a lateral edge 7 forming a bearing surface 20 on which the edge 5b of the frame 5 will be pressed. FIG. 9 shows that the fastening lug 13 of the locking device is constituted by a bracket integral with the upright 7 onto which a screw/nut assembly is fastened.

When the windscreen is folded down, the screw 16 penetrates in a throat 22 in the fastening stud 15 integral with the cab (see FIG. 8). The nut on the screw 16 is then tightened until it presses on the stud 15, thereby fixing the windscreen 4 in its folded down position to the cab 2.

What is claimed is:

1. A fold down device for a windscreen of a vehicle, the fold down device comprising:
    a plurality of uprights, each of the plurality of uprights is placed in a vicinity of a lateral edge of the windscreen;
    a plurality of hinges;
    a plurality of connecting rods; wherein
        each of the plurality of uprights is hinged at a first end to a structure of a cab of the vehicle,
        the windscreen is linked to each of the plurality of uprights by a corresponding one of the plurality of connecting rods that is hinged on one side to a second end of each of the plurality of uprights, and on the other side to the windscreen, and
        at least one of the plurality of uprights incorporates a bearing surface able to receive the windscreen.

2. A fold down device for a windscreen according to claim 1, wherein at least one hinge of each of the plurality of connecting rods is placed above the center of gravity (G) of said windscreen.

3. A fold down device for a windscreen according to claim 1, wherein each of the plurality of connecting rods incorporates means to adjust its length.

4. A fold down device for a windscreen according to claim 1, wherein at least one of the plurality of uprights incorporates means to make said windscreen in its folded down position integral with said cab.

5. A fold down device for a windscreen according to claim 3, wherein said device comprises at least one helper spring fixed between at least one of the plurality of uprights and said cab.

6. A fold down device for a windscreen according to claim 2, wherein at least one of the plurality of uprights incorporates a bearing surface able to receive said windscreen.

7. A fold down device for a windscreen according to claim 2, wherein each of the plurality of connecting rods incorporates means to adjust its length.

8. A fold down device for a windscreen according to claim 1, wherein said device comprises at least one helper spring fixed between one of the plurality of uprights and said cab.

* * * * *